United States Patent
Yu et al.

(10) Patent No.: US 8,405,716 B2
(45) Date of Patent: Mar. 26, 2013

(54) FOLDING OPTICAL PATH TRANSFER VIDEOMETRICS METHOD FOR MEASURING THE THREE-DIMENSIONAL POSITION AND ATTITUDE OF NON-INTERVISIBLE OBJECTS

(76) Inventors: Qifeng Yu, Hunan (CN); Yang Shang, Hunan (CN); Xiaohua Ding, Hunan (CN); Xiaohu Zhang, Hunan (CN); Guangwen Jiang, Hunan (CN)

( * ) Notice: Subject to any disclaimer, the term of this patent is extended or adjusted under 35 U.S.C. 154(b) by 846 days.

(21) Appl. No.: 12/539,402

(22) Filed: Aug. 11, 2009

(65) Prior Publication Data

US 2010/0066827 A1 Mar. 18, 2010

Related U.S. Application Data

(63) Continuation of application No. PCT/CN2007/000476, filed on Feb. 12, 2007.

(51) Int. Cl.
H04N 7/18 (2006.01)
(52) U.S. Cl. ........ 348/135; 348/142; 348/144; 348/148; 348/149; 348/159
(58) Field of Classification Search .................. 348/135
See application file for complete search history.

(56) References Cited

U.S. PATENT DOCUMENTS

| | | | | |
|---|---|---|---|---|
| 3,866,229 | A * | 2/1975 | Hammack | 342/451 |
| 6,081,670 | A * | 6/2000 | Madsen et al. | 396/88 |
| 2002/0090217 | A1 * | 7/2002 | Limor et al. | 396/429 |

FOREIGN PATENT DOCUMENTS

| | | |
|---|---|---|
| CN | 1584502 A | 2/2005 |
| CN | 1818546 A | 8/2006 |
| JP | 2004-085553 A | 3/2004 |
| JP | 2005-172703 A | 6/2005 |

OTHER PUBLICATIONS

International Search Report for International Application No. PCT/CN2007/000476 dated Nov. 15, 2007.

* cited by examiner

*Primary Examiner* — Tung Vo
*Assistant Examiner* — Obafemi Sosanya
(74) *Attorney, Agent, or Firm* — Knobbe, Martens, Olson & Bear LLP

(57) ABSTRACT

A folding optical path transfer videometrics method for measuring the three-dimensional position and attitude of non-intervisible objects is disclosed. In one aspect, the method includes the following: constructing a folding optic path between an invisible target and a reference, disposing transfer station comprising a camera, a cooperating mark and a laser range finder on each break point in the folding optic path. The method may further include processing an image shot by each camera, accounting for the distance measured by the laser range finder, obtaining a position and posture information corresponding to each adjacent transfer station, summing the values from the reference to the invisible target, and achieving three-dimensional position and posture of the invisible target relating to the reference.

2 Claims, 3 Drawing Sheets

FOLDING OPTICAL PATH TRANSFER VIDEOMETRICS METHOD FOR MEASURING THE THREE-DIMENSIONAL POSITION AND ATTITUDE OF NON-INTERVISIBLE OBJECTS

CROSS-REFERENCE TO RELATED APPLICATIONS

This application is a continuation of International Application Number PCT/CN2007/000476, titled "A PHOTO-GRAMMETRIC METHOD USING FOLDING OPTIC PATH TRANSFER FOR AN INVISIBLE TARGET OF THREE-DIMENSIONAL POSITION AND POSTURE", filed on Feb. 12, 2007. The above-referenced application is incorporated by reference in its entirety.

BACKGROUND

1. Field of the Invention

This application relates to the fields of image based optical measurement technology, videometrics measurement, and computer vision, in particular, a folding optical path transfer videometrics method for measuring the three-dimensional position, attitude, and their change of non-intervisible objects.

2. Description of the Related Art

Videometrics finds wide application in many fields thanks to its high precision, non-contact, and low cost. However, common videometrics techniques are able to measure only the relative position and attitude of intervisible objects, and they generally become useless when it comes to the measurement of relative position and attitude of non-intervisible objects which widely exist in practical constructions. In constructions and geodetic surveying and mapping, non-intervisible points can be surveyed by setting up middle control points on the obstacles or by avoiding obstacles via relaying of multiple stations when GPS or total stations are used. However, they can determine only the position of the point to be measured but fails to give the three-dimensional position or attitude results of the target. To be even worse, the station setting by those methods are over-complicated, plus real-time measurement is hard to realize when dynamic problems are concerned.

In real constructions, especially large-scale constructions, there are needs for the measurement of the position, attitude, and their change of non-intervisible objects. For example, ship deformations of large vessels take place by the reason of wave impact, temperature differences, load changes, aging, and battle damages, etc., and there is need to measure those deformations; Ship deformation causes changes in the attitude angles of shipboard armament relative to the ship measurement reference, while an intervisible optical path is rare between the measurement reference and the armament to be measured due to the complexity of ship structure, which makes it difficult to precisely align the attitude angle of the armament to the measurement reference. In the construction of tunnel and subways, measuring and monitoring the deformation of the cross section and wall rock are often troubled by short intervisible distance due to the limited tunnel space and the disturbance of ventilation and construction devices. In a word, the lack of an intervisible optical path between the measuring target and the measurement reference in practical constructions denies the application of the conventional videometrics technologies.

SUMMARY

In one embodiment, the invention provides a folding optical path transfer videometrics method for measuring the three-dimensional position and attitude of non-intervisible objects, the method comprising constructing a folding optical path between the measuring reference and the non-intervisible measured target to dodge obstacles, wherein a reference platform comprises a starting point and the measured target comprises a terminal point and the folding optical path comprises at least one turning point, setting measurement relaying stations, each measurement station comprising at least one of a camera, a cooperative marker, and a laser rangefinder, on the starting point, the terminal point, and the at least one turning point of the folding optical path mentioned above, wherein neighboring relaying stations are intervisible, calibrating installing parameters of each relaying station, wherein the installing parameters comprises at least one of positional and attitude relations among cooperative markers, cameras and laser rangefinders in a certain relaying station, setting synchronous triggering systems of all the cameras and laser rangefinders, obtaining a three-dimensional position and an attitude of each neighboring relaying station relative to one another, by viewing the cooperative marker in the neighboring relaying station using the camera and measuring the distance using the laser rangefinder, and obtaining a second three-dimensional position and a second attitude of the measuring target relative to the measuring reference by relaying measurement information from the starting point to the terminal point of via folding optical path.

DETAILED DESCRIPTION OF CERTAIN EMBODIMENTS

Figure 1:
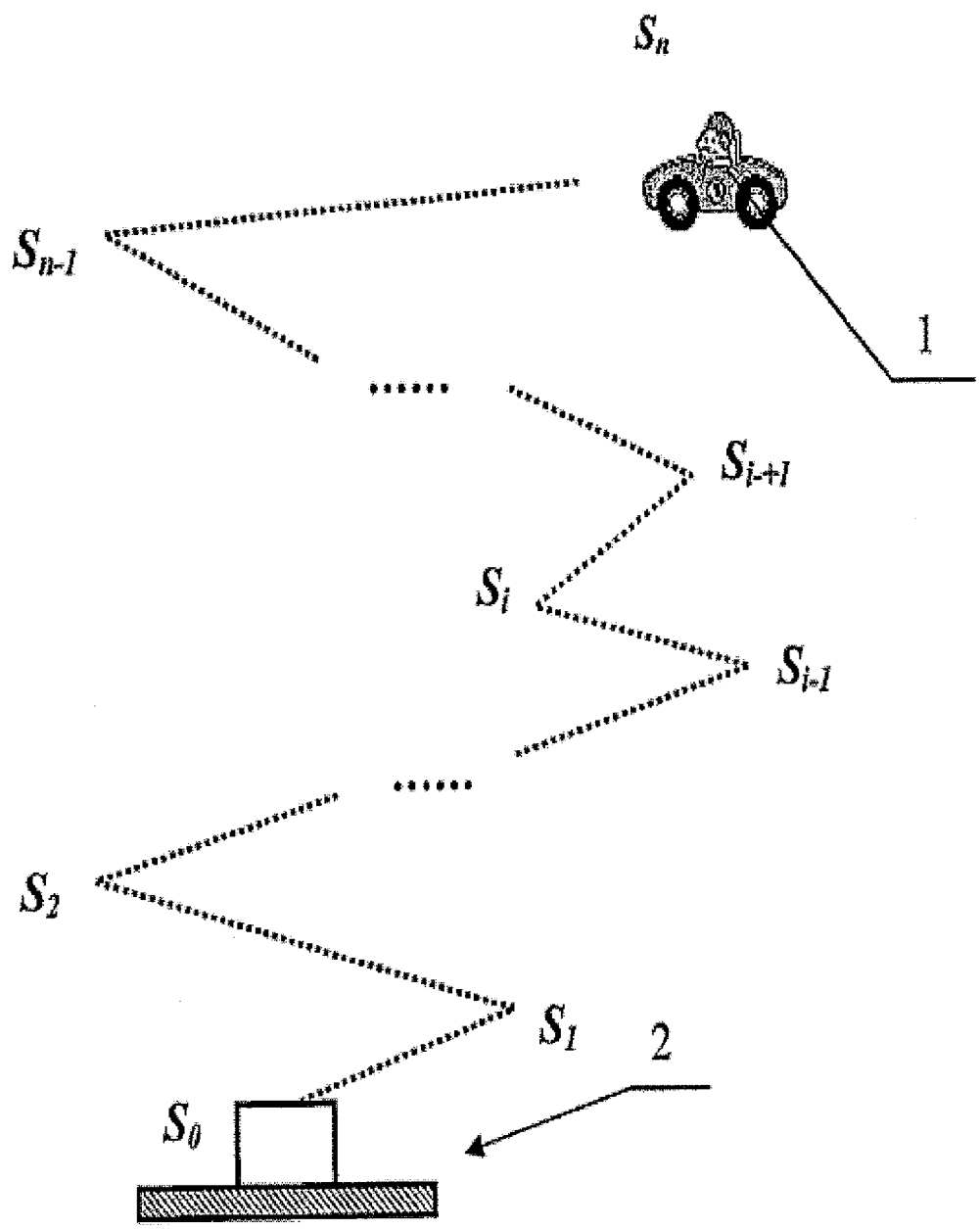
FIG. 1 shows the construction of folding optical path of according to one embodiment.
Figure 2:
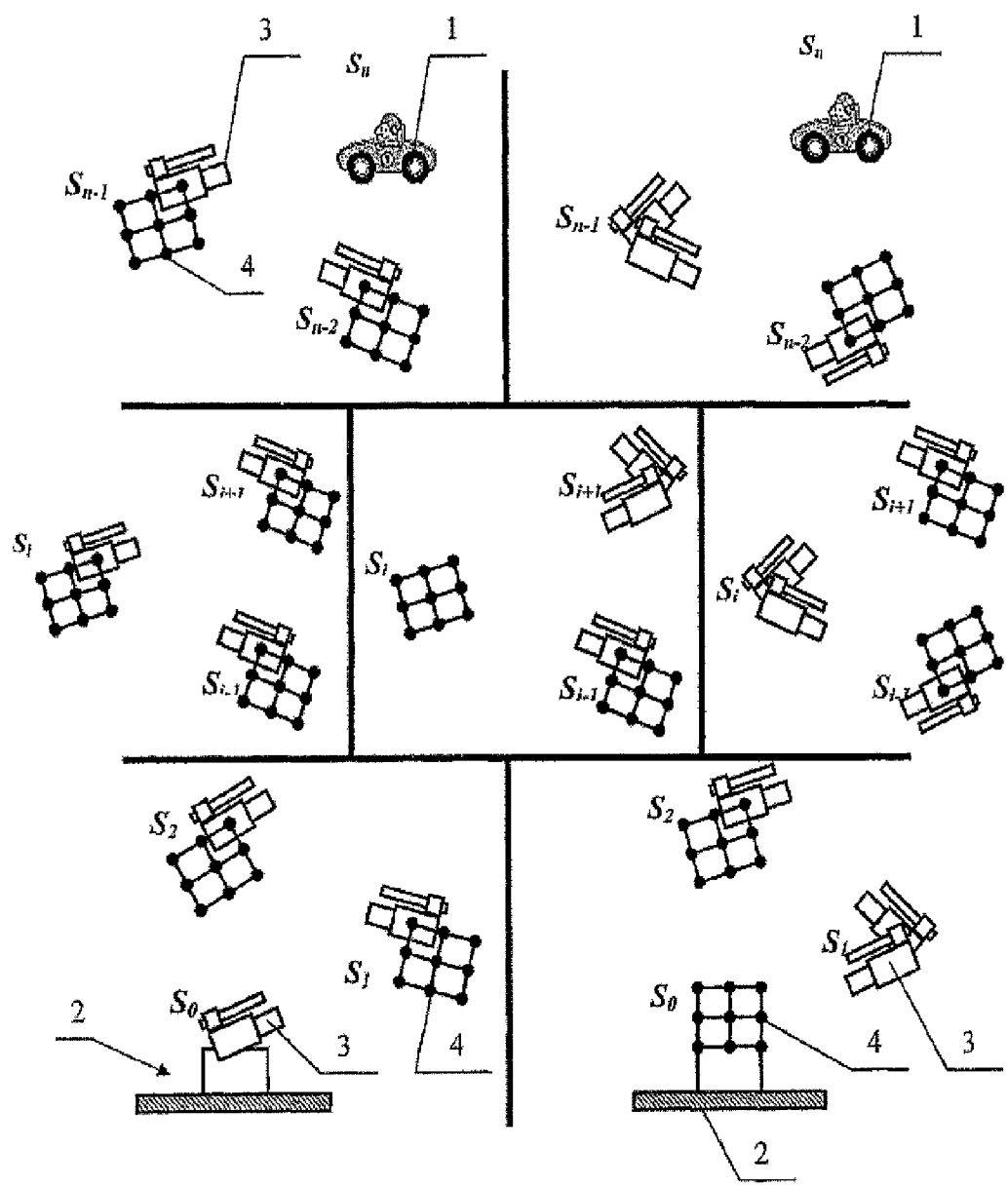
FIG. 2 shows a sketch map of components and composition forms of relaying stations according to another embodiment.
Figure 3:
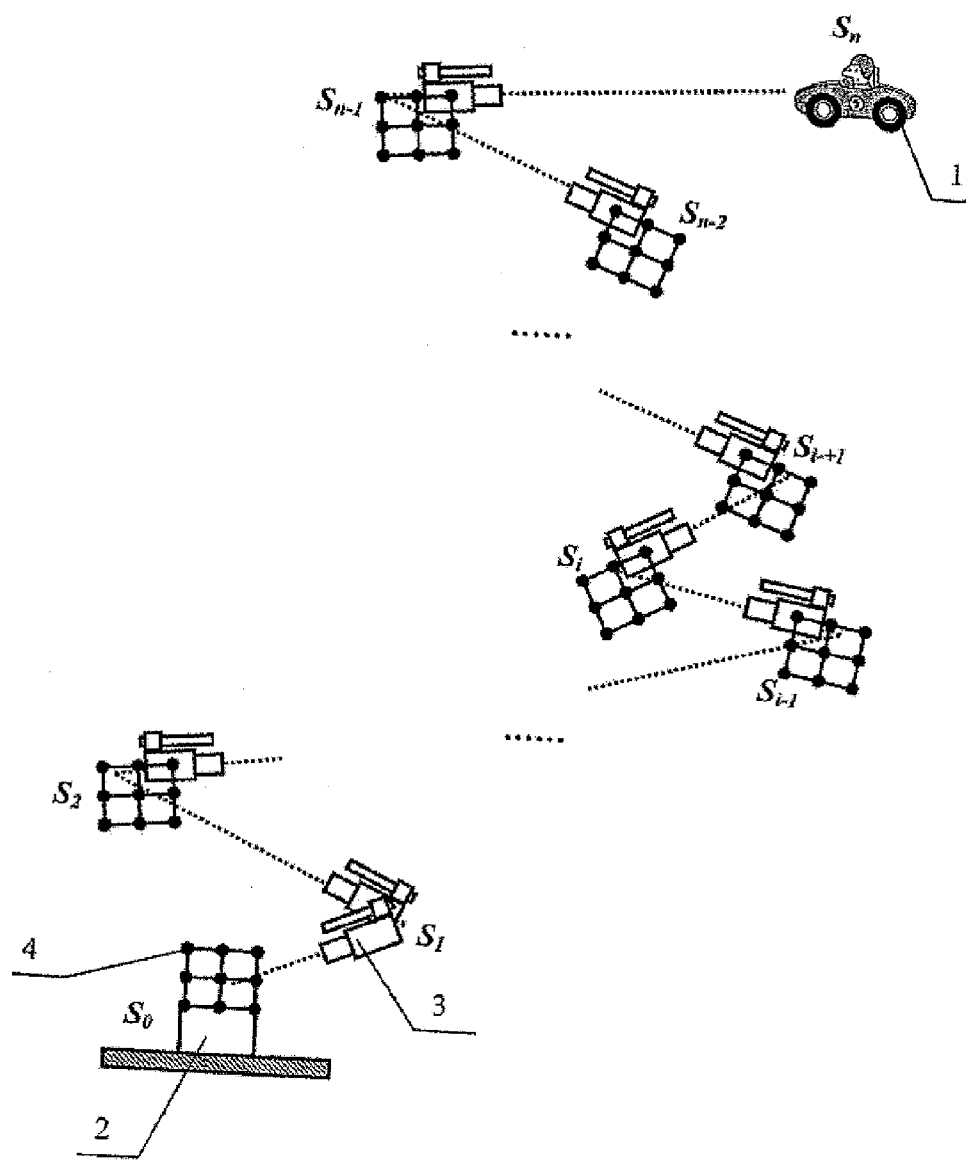
FIG. 3 shows a construction form of folding optical path system according to yet another embodiment.

For the FIGS. 1 through 3, element 1 represents the target, element 2 represents the reference, element 3 represents the camera and laser range finder, element 4 represents the cooperative marker, elements $S_i$ (where i=0, ..., n) represent the relaying station at level I, element $S_0$ represents the reference platform (starting point, relaying station at level 0), and element $S_n$ represents the measuring target (terminal point, relaying station at level n).

On embodiment allows the measurement of the three-dimensional position, attitude, and the change of the position and attitude of the non-intervisible objects by fold line videometrics measurement.

The technical solution of the fold line relaying videometrics measuring the three-dimensional position, attitude, and their change of non-intervisible objects described by on embodiment is presented as following:

Set the measuring reference as the starting point and the measuring target the terminal point, and construct a folding optical path between the non-intervisible measuring reference and target to avoid obstacles;

On the starting point, each reflection point of the path and the terminal point, to set relay stations; the said relay stations are composed of one type or several types of cameras, laser distance meters, and cooperative markers; the neighboring relay stations are intervisible; and then following steps are carried out:

(1) To calibrate installation parameters of the cameras, laser distance meters, and cooperative markers of each relay station, i.e., their positional and attitude relations; then to set the synchronization of the image collection by each camera and the laser distance measurement;

(2) To obtain the relative three-dimensional positions and attitudes of the neighboring relay stations to one another by observing cooperative markers of them through cameras and by laser distance measuring;

(3) To transfer and accumulate stepwise from the starting point of the folding optical path (i.e., the reference) to the terminal point (i.e., the target); finally the three-dimensional positions and attitudes of the target relative to the reference are obtained.

The construction of the folding optical path is shown by FIG. 1. The technical solution of the folding optical path transfer videometrics method of measuring the three-dimensional positions and attitudes of non-intervisible objects described in this embodiment is as follows: Relay stations $S_i$, i=0 . . . n, are set successively from the measuring reference to the target and the neighboring stations are thus kept intervisible in order to construct a folding optical path. The relative three-dimensional positions and attitudes of relay stations neighboring to one another are measured with the cameras, laser distance meters, and cooperative markers which are configured in the stations, then the parameters of the three-dimensional positions and attitudes of the measuring target relative to the reference are obtained by progressively accumulating the three-dimensional positional and attitude results of one station relative to another from the measuring reference to the target.

Using rotation matrix $R_{i,i+1}$ and translation vector $T_{i,i+1}$ to describe the relative three-dimensional position and attitude respectively between the relaying station $S_i$ at the level i and the relaying station $S_{i+1}$ at the level i+1, and using rotation matrix $R_{0,n}$ and translation vector $T_{0,n}$ to describe the three-dimensional position and attitude of the measured target relative to the measuring reference, after each parameter $R_{i,i+1}$ and $T_{i,i+1}$ has been obtained by camera capturing images and laser rangefinder measuring distance, the algorithm for calculating the three-dimensional position and attitude of the measured target relative to the measuring reference by stepwise pose relaying from the measuring reference (starting point, relaying station at the level 0) to the measured target (terminal point, relaying station at level n) is:

$$R_{0,n} = \sum_{i=0}^{n-1} R_{i,i+1} \quad (1)$$

$$T_{0,n} = T_{n-1,n} + \sum_{i=0}^{n-2}\left(T_{i,i+1} \prod_{j=i+1}^{n-1} R_{j,j+1}\right) \quad (2)$$

The number (level) of relaying stations as well as the specific constituents and configuration forms of each relay station are determined by practical measurement task needs.

Relaying stations at different levels in the fold line are built by their own components. Their components and combination forms are flexible in order to meet the measuring needs for relative position and attitude of relaying stations at neighboring levels, that is, to ensure that the camera in one relaying station can capture the image of the cooperative marker in the neighboring relaying station, and the cooperative marker in one relaying station can be captured by the camera in the neighboring relaying station. Their combination is multiple as shown by FIG. 2. In the combination of a camera and a laser rangefinder, the latter is optional which is used to improve the measuring precision of the relative positional parameter. Moreover, the "camera" in each relaying station can be either a single camera or a group of cameras. Cooperative markers may be set on the measuring target. It all depends on the measuring needs. FIG. 3 shows a typical construction of a relaying station and its fold line path.

In one embodiment, the first step is to calibrate the relative position and attitude among cooperative markers, cameras, and laser rangefinder in each relaying station, which include the relative position and attitude of the reference and the cooperative marker or the camera fixed on it, and the relative position and attitude of the cooperative marker relative to the measuring target, if it is fixed on the latter. The second step is to synchronously trigger each camera and laser rangefinder. The cameras capture images of the cooperative markers fixed on the neighboring relaying station or the measuring target, and the laser rangefinders measure the distance of the cooperative markers fixed on the neighboring relaying station or the measuring target meantime. The information of position and attitude of one relaying station relative to its neighbor is obtained by processing the images and resolving them with the distances measured. Finally, the three-dimensional position and attitude of the measuring target relative to the reference are calculated with formulas (1) and (2) after stepwise relaying the measuring results of relative position and attitude of each neighboring relaying station from the measuring reference to the measuring target.

Through programming control and automatic resolution, the relative three-dimensional position and attitude of each neighboring relaying station to one another and those of the measuring targets relative to the reference can be obtained real-time. Therefore, the three-dimensional motion parameters such as velocity and acceleration (variations of the three-dimensional position and attitude) of the target at each moment can be real-time obtained when it comes to dynamic measurement as well.

Implementation Algorithm: In videometrics measurement, there are existing general-purpose methods to calibrate the cameras, the relative positions and attitudes among camera, laser rangefinder, and cooperative marker of each relaying station, the position and attitude of the camera or cooperative marker fixed on the measuring reference, and the position and attitude of the cooperative marker which is possibly fixed on the measuring target. The calibration can be carried out according to the real situation. This belongs to the prior art and will not be specified in present application.

Likewise, the resolution of the relative three-dimensional position and attitude of the cooperative marker relative to the camera by analyzing and processing images is one of the basic issues in videometrics and computer vision field, so this application skips the description of it given that there are sufficient discussions and concrete algorithms about it in the prior art.

After the information of the relative three-dimensional position and attitude of neighboring relaying stations is obtained, the afore mentioned formulas (1) and (2) serve as the algorithm to stepwise relay and calculate the three-dimensional positions and attitudes of the measuring target relative to the reference from the reference to the target.

$$R_{0,n} = \sum_{i=0}^{n-1} R_{i,i+1} \quad (1)$$

$$T_{0,n} = T_{n-1,n} + \sum_{i=0}^{n-2}\left(T_{i,i+1} \prod_{j=i+1}^{n-1} R_{j,j+1}\right) \quad (2)$$

where the rotation matrix $R_{0,n}$ and the translation vector $T_{0,n}$ are used to describe the three-dimensional position and attitude of the measuring target relative to the reference platform;

the rotation matrix $R_{i,i+1}$ and the translation vector $T_{i,i+1}$ are used to describe the relative three-dimensional position and attitude between the relaying station $S_i$ and the neighboring relaying station $S_{i+1}$.

In actual measurement, the laser rangefinder is not a necessity when the position and variation of the measuring target is not of interest, and only the relative attitude and variation are to be measured since the relative positional relations and variations of relaying stations need not be taken into consideration in this case. There is no need for high precision in measuring the relative position, because an analysis of the images collected by cameras would suffice to help obtain the relative position and attitude. Therefore, laser rangefinders need not involve. However, a laser rangefinder becomes necessary when high precision is required in the measurement of the position and attitude of the target, especially in that of the relative position. Positional and attitude information can be resolved precisely by combining the distance measured by the laser rangefinder with the images captured by cameras.

To conclude, this certain embodiments relate to a fold line relaying videometrics method measuring the position, attitude and their changes of non-intervisible objects. Both the relative three-dimensional position and attitude of neighboring relaying stations and those of the measuring target relative to the reference can be obtained in a real-time manner. It is also workable with dynamic measurement to obtain the three-dimensional motion parameters such as velocity and acceleration (i.e., the three-dimensional position and attitude and their changes) of the target at each moment. In addition to the advantages of high precision, non-contact, and low cost of the optical measuring techniques, this embodiment also offers a solution to the lack of intervisible optical path between the measuring target and reference. It also features with high automation, digitalization and avoiding damaging non-intervisible constructions.

One embodiment comprises the following steps:

(1) To design the specific form of the fold line according to the measuring requirement and the spot situation;

(2) To configure and install the cooperative markers, the cameras, the laser rangefinders of relaying stations at each level;

(3) To calibrate the interior parameters of the cameras of relaying stations at each level, the positional and attitude relations among cooperative markers, cameras and laser rangefinders, the position and attitude of the cooperative marker or the camera fixed on and combined with the reference platform relative to the latter, and the position and attitude of the cooperative marker, if it is fixed on and combined with the measuring target, relative to the latter;

(4) To set the triggering and controlling system;

(5) To construct the fold line videometrics measuring system by setting all relaying stations and the triggering and controlling system on the spot;

(6) To real-time trigger, collect images, and measure distances;

(7) To real-time resolve the three-dimensional position and attitude of each neighboring relaying station relative to one another, the three-dimensional position and attitude of the measuring target relative to the reference platform, and the three-dimensional motion parameters of the target at each moment;

(8) To real-time output the measuring results.

FIG. 3 is a construction form of the folding optical path according to the practical measurement need. In this typical construction, a cooperative marker is fixed on the measuring reference (relaying station at level 0); the relaying station at level 1 is constructed by fixing and combining two sets of cameras and laser rangefinders, one of which is used to measure the cooperative marker fixed on the reference, while the other of which to measure the cooperative marker of the relaying station at level 2. The relaying station at level 2 is composed of one set of camera, laser rangefinder and cooperative marker, where the camera and the rangefinder measure the cooperative marker fixed in the relaying station at level 3 . . . till relaying station at level i which is composed of one set of camera, laser rangefinder and cooperative marker, where the camera and the rangefinder measure the cooperative marker fixed in the relaying station at level i+1. Likewise, the relaying station at level n−1 is again composed of one set of camera, laser rangefinder and cooperative marker, where the camera and the rangefinder measure the target.

The folding optical path videometrics method for measuring the three-dimensional positions and attitudes of non-intervisible objects of this embodiment has an implementation system composed of the following parts:

(1) Calibration Part: to complete the calibrating tasks before the experiment using a calibrated reference (such as a grid panel) and assistant cameras. The tasks include:

(a) interior parameters of the cameras of each relaying station;

(b) the relative position and attitude of cameras which form the camera group;

(c) the relative position and attitude among camera, laser rangefinder, and cooperative marker in each relaying station at all levels;

(d) the relative position and attitude of the measuring reference and the camera or the cooperative marker fixed on it;

(e) the position and attitude of the cooperative marker relative to the measuring target, if it is fixed on the latter.

(2) Image Capturing and Distance Measuring Part: to realize the simultaneous and real-time image capturing by each camera and distance measuring by the laser rangefinder. It contains the following constituents:

(a) Fold line relaying stations at each level, which include cameras, laser rangefinders, and/or cooperative markers fixed together;

(b) A synchronous triggering and controlling system, which sends commands to cameras and distance rangefinder to trigger them to collect images or measure distances, and finally receives and stores the images collected by cameras and distances measured by laser rangefinders;

(c) Installing tools which are used to firmly install each relaying station on the turning point of the fold line in order to avoid changes taking place on the relative positions and attitudes among cooperative markers, laser distance meters, and camera systems of each relaying station in the measuring process, which will significantly influence the measuring results (3) Data Processing Part: to performs the following data processing functions:

(a) Processing of the data needed by calibration. It involves the processing of images collected in calibration to resolve of the relative positions and attitudes among cameras, laser rangefinders, and cooperative markers of all relaying stations, the relative positions and attitudes of the measuring reference and the camera or the cooperative marker fixed on it, and the relative positions and attitudes of the cooperative marker to the measuring target, if it is fixed on the latter;

(b) Processing of the data needed in the measurement. It involves either real-time or post-processing of the image data, distance data, and all other necessary data (such as exposure moment, etc.) to resolve the three-dimensional position and attitude of each relaying station relative to one another, and the three-dimensional position and attitude of the measuring targets relative to the reference platform. As to the dynamic measurement, it obtains the three-dimensional motion parameters (i.e., variable quantities of the three-dimensional positions and attitudes) of the target at each moment.

The implementation algorithm is (see also FIG. 3):

To set reference platform as the starting point and measuring target as the terminal point, relay stations $S_i$, i=0 . . . n, are set successively from the measuring reference to the target and the neighboring stations are thus kept intervisible in order to construct a folding optical path to avoid the obstacles between the non-intervisble target and reference; The relative three-dimensional positions and attitudes of relay stations neighboring to one another are measured with the cameras, laser distance meters, and cooperative markers which are configured in the stations, then the parameters of the three-dimensional positions and attitudes of the measuring target relative to the reference are obtained by progressively accumulating the three-dimensional positional and attitude results of one station relative to another from the measuring reference to the target.

Using rotation matrix $R_{i,i+1}$ and translation vector $T_{i,i+1}$ to describe the relative three-dimensional position and attitude respectively between the relaying station $S_i$ at the level i and the relaying station $S_{i+1}$ at the level i+1, and using rotation matrix $R_{0,n}$ and translation vector $T_{0,n}$ to describe the three-dimensional position and attitude of the measured target relative to the measuring reference, after each parameter $R_{i,i+1}$ and $T_{i,i+1}$ has been obtained by camera capturing images and laser rangefinder measuring distance, the algorithm for calculating the three-dimensional position and attitude of the measured target relative to the measuring reference by stepwise pose relaying from the measuring reference (starting point, relaying station at the level 0) to the measured target (terminal point, relaying station at level n) is:

$$R_{0,n} = \sum_{i=0}^{n-1} R_{i,i+1} \tag{1}$$

$$T_{0,n} = T_{n-1,n} + \sum_{i=0}^{n-2}\left(T_{i,i+1} \prod_{j=i+1}^{n-1} R_{j,j+1}\right) \tag{2}$$

What is claimed is:

1. A folding optical path transfer videometrics method for measuring the three-dimensional position and attitude of non-intervisible objects, the method comprising:
    constructing a folding optical path between the measuring reference and the non-intervisible measured target to dodge obstacles, wherein a reference platform comprises a starting point and the measured target comprises a terminal point and the folding optical path comprises at least one turning point;
    setting measurement relaying stations, each measurement station comprising at least one of a camera, a cooperative marker, and a laser rangefinder, on the starting point, the terminal point, and the at least one turning point of the folding optical path mentioned above, wherein neighboring relaying stations are intervisible;
    calibrating installing parameters of each relaying station, wherein the installing parameters comprises at least one of positional and attitude relations among cooperative markers, cameras and laser rangefinders in a certain relaying station;
    setting synchronous triggering systems of all the cameras and laser rangefinders;
    obtaining a three-dimensional position and an attitude of each neighboring relaying station relative to one another, by viewing the cooperative marker in the neighboring relaying station using the camera and measuring the distance using the laser rangefinder;
    obtaining a second three-dimensional position and a second attitude of the measuring target relative to the measuring reference by relaying measurement information from the starting point to the terminal point of via folding optical path,
    wherein a rotation matrix $R_{i,i+1}$ and a translation vector $T_{i,i+1}$ are used to describe the relative three-dimensional position and attitude respectively between a relaying station $S_i$ at a level i and a relaying station $S_{i+1}$ at a level i+1, wherein a rotation matrix $R_{0,n}$ and a translation vector $T_{0,n}$ is used to describe the three-dimensional position and attitude of the measured target relative to the measuring reference, after each parameter $R_{i,i+1}$ and $T_{i,i+1}$ has been obtained by a camera capturing images and a laser rangefinder measuring distance, and wherein the algorithm for calculating the three-dimensional position and attitude of the measured target relative to the measuring reference by relaying measurement information from the measuring reference (starting point, relaying station at the level 0) to the measured target (terminal point, relaying station at level n) is:

$$R_{0,n} = \sum_{i=0}^{n-1} R_{i,i+1}$$

$$T_{0,n} = T_{n-1,n} + \sum_{i=0}^{n-2}\left(T_{i,i+1} \prod_{j=i+1}^{n-1} R_{j,j+1}\right).$$

2. The folding optical path transfer videometrics method of claim 1, wherein the dynamic measurement, the relative three-dimensional positions and attitudes among relaying stations, and the three-dimensional positions and attitudes of the measured targets relative to the measuring references are obtained in real-time.

* * * * *